May 30, 1967     W. E. FOLEY     3,322,481
POSITIONALLY ADJUSTABLE MICROSCOPE ILLUMINATOR
Filed Oct. 1, 1962
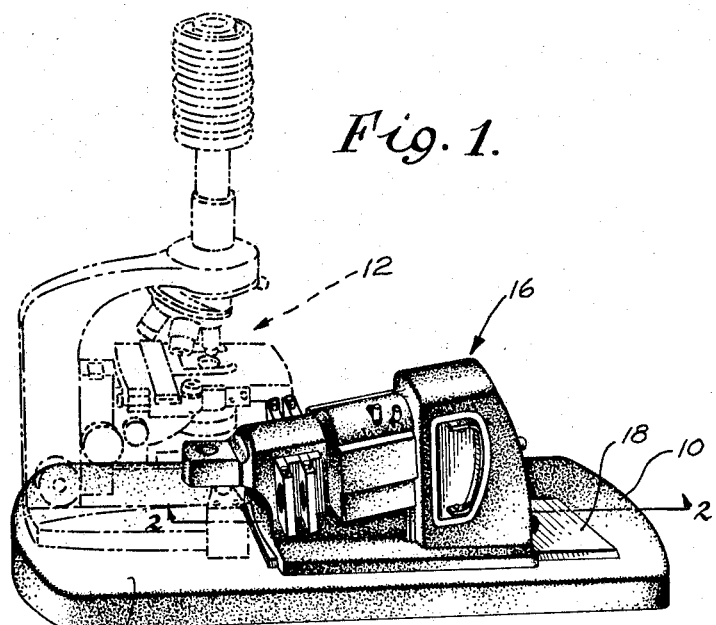
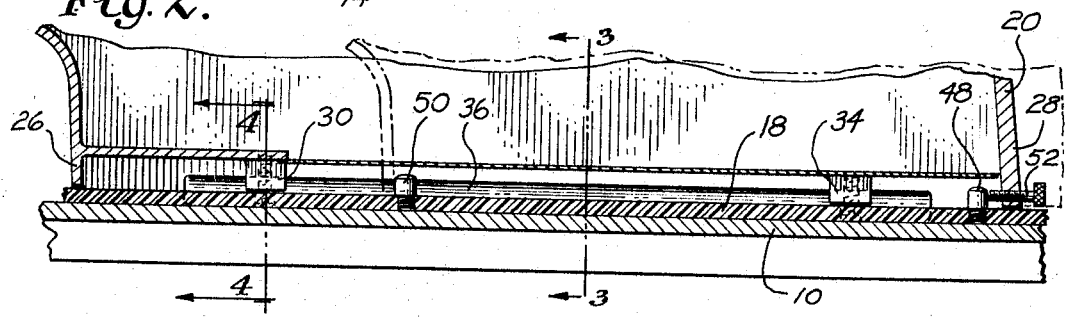
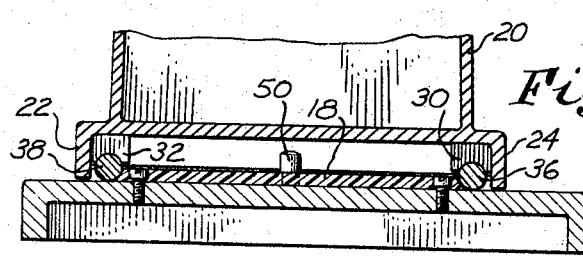
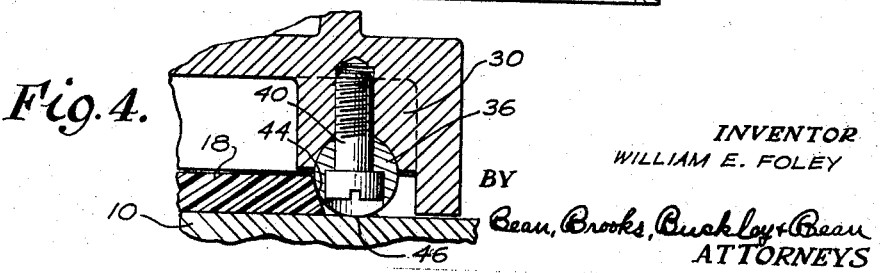
INVENTOR
WILLIAM E. FOLEY
BY Bean, Brooks, Buckley & Bean
ATTORNEYS United States Patent Office 3,322,481
Patented May 30, 1967

3,322,481
POSITIONALLY ADJUSTABLE MICROSCOPE
ILLUMINATOR
William E. Foley, Buffalo, N.Y., assignor to American
Optical Company, Southbridge, Mass.
Filed Oct. 1, 1962, Ser. No. 227,317
3 Claims. (Cl. 350—87)

This invention relates to mechanism for use in conjunction with microscopes and pertains more particularly to an assembly including a fluorescent light source which is positionally adjustable relative to a microscope so that, when once adjusted, the light source may be moved away from the microscope and then returned to its original aligned position relative thereto.

In certain areas of microscopy, it is desirable to illuminate the field being studied with fluorescent or ultraviolet light and for this purpose, special illuminating means having such type of light source are provided. The light source must be positionally adjusted relative to the microscope in order to properly project the fluorescent light into the optical system of the microscope. However, it is frequently necessary to move the light source away from the microscope as for example for making an adjustment of the substage condenser or for various other purposes which may arise. Under these circumstances, the positional adjustment of the light source relative to the microscope must be redone and since this readjustment is time consuming, it detracts from the efficiency of operation. It is, therefore, of primary concern in connection with the present invention to provide a fluorescent illumination assembly for use in conjunction with microscopes wherein once the light source is positionally adjusted relative to the microscope, the light source may be moved away from the microscope so as to leave the same unimpeded for adjustment purposes or for use with a different type of illumination and the light source may then be moved back into proper position adjustment relationship with the microscope without requiring further manipulational adjustment by the operator.

More specifically, it is an object of this invention to provide a common platform or support for a microscope and a fluorescent illumination system therefor in which the fluorescent light source is freely movable between opposite extremes of positional adjustment relative to the microscope, one of which is adjustable to provide proper alignment between the light source and microscope so that the light source can be moved away from the microscope and then repositioned properly relative thereto without requiring further adjustment or manipulation.

Other objects and advantages of the invention will appear from the description hereinafter and the accompanying drawing wherein:

FIG. 1 is a perspective view of the light source mechanism in accordance with the present invention showing a microscope in dotted lines operatively related thereto;

FIG. 2 is an enlarged vertical section taken substantially along the plane of section line 2—2 in FIG. 1 and showing details of the position adjustment mechanism;

FIG. 3 is a transverse section taken substantially along the plane of section line 3—3 in FIG. 2 illustrating details of the guide mechanism; and FIG. 4 is an enlarged vertical section taken substantially along the plane of section line 4—4 in FIG. 2 showing the manner of mounting the guide bars.

As shown most clearly in FIG. 1, fluorescent illumination system according to the present invention consists essentially of a supporting or mounting platform indicated by the reference character 10 upon which is adapted to rest a microscope as indicated by the dotted lines and by the reference character 12, the platform 10 being free at one end portion 14 thereof to provide a suitable table for supporting the microscope 12. A light source assembly 16 is movably mounted on the platform 10 for movement toward and away from the microscope 12 as supported on the end portion 14, there being suitable guide means, specifically the guide plate 18 provided for guidably achieving the longitudinal adjustment of the light source assembly 16.

As can be seen more clearly in FIGS. 2 and 3, the light source 16 includes a base 20 which is open at its bottom, being bounded by depending side skirt portions 22 and 24, a forward end skirt portion 26 and a rear end skirt portion 28. The side skirt portions 22 and 24 are provided on their inner sides with support lug portions such as those indicated by reference characters 30 and 32 in FIG. 3 and by reference characters 30 and 34 in FIG. 2. That is to say, each skirt portion 22 and 24 has a pair of such lugs associated therewith. Each pair of lugs mounts a longitudinally extending guide bar 36 and 38 each bar having a counterbore opening transversely therethrough for receiving a fastening member such as the member 40 in FIG. 4 cooperating with the associated lug 30 in each case to rigidly affix the bars 36 and 38 in spaced parallelism with each other and in horizontally downwardly projecting relationship so as to straddle the guide plate 18 in the manner shown.

As can be best seen in FIG. 4, the opposite side edges of the guide plate 18 are slightly beveled and the spacing between the bars 36 and 38 is such as to simultaneously engage each bar, at 44, against the corresponding side edge of the guide plate 18 and, at 46, against the upper surface of the platform 10. In this fashion, the light source assembly 16 is guidably mounted for longitudinal movement upon the platform 10 toward and away from the end portion 14 thereof upon which the microscope is adapted to be mounted.

As can be seen best in FIG. 2, a pair of stop members 48 and 50 are fixedly carried by the platform 10 the same being disposed in upstanding relationship to the upper surface of the guide plate 18 so that the stop member 50 cooperates with the depending end skirt portion 26 of the light source assembly 16 to limit movement thereof in one direction as is shown in dotted lines in FIG. 2. The other stop member 48 is adapted to cooperate with an abutment member 52 which in the specific form shown is a screwthreaded member engaged through the skirt portion 28 and which therefore can adjustably limit the opposite extremity of the movement of the light source 16 as is shown in full lines in FIG. 2. Thus, when initially adjusting the light source 16 relative to the microscope 12, the adjustment member 52 is utilized to establish the precise position of these two entities relative to each other so as to provide the proper fluorescent light illumination for the microscope 12. If it is subsequently desired for any reason to move the light source 16 away from the microscope and consequently out of alignment therewith, the light source can be moved in such direction so that the skirt portion 26 engages against the stop 50 or to an intermediate position, the proper adjustment or the like made in conjunction with the microscope 12 and then the light source 16 can be repositioned to its initial and properly aligned relationship by simply moving the same in the opposite direction so that the abutment member 52 engages the stop member 48. In this fashion the light source need not be repositioned relative to the microscope every time misalignment therebetween is necessitated.

I claim:

1. An illumination mechanism for microscopes, comprising in combination,
    a platform adapted to support a microscope at one end and a light source assembly at the opposite end, the latter being guidably movable toward and away from the former for movement into and out of alignment with the substage condenser of a microscope, guide means rigid with said platform, a light source assembly engaged with said guide means for guided movement longitudinally of the platform, as aforesaid, said light source assembly including a depending skirt portion at that end thereof remote from said one end of the platform, stop means rigid with said platform and projecting upwardly therefrom above the elevation of said skirt portion, and abutment means adjustably carried by said skirt portion for engagement with said stop means when the light source assembly is moved toward said one end of the platform.

2. An illumination mechanism for microscopes, comprising in combination, a mounting platform, a light source having a base provided with a pair of spaced apart and parallel guide bars disposed in horizontal, downwardly projecting relation from the undersurface of said base, a guide plate fixed to said platform, said guide bars being disposed in straddling relation to said guide plate and each guide bar simultaneously engaging a corresponding side edge of the guide plate and the upper surface of said mounting platform, a stop member fixed to and projecting upwardly from said guide plate, said base of the light source having a depending skirt portion at one end clearing the upper surface of the guide plate, and an adjustable abutment member carried by said skirt portion for engaging said stop member.

3. An illumination mechanism for microscopes, comprising in combination, a mounting platform, a light source having a base provided with a pair of spaced apart and parallel guide bars disposed in horizontal, downwardly projecting relation from the undersurface of the said base, a guide plate fixed to said platform, said guide bars being disposed in straddling relation to said guide plate and each guide bar simultaneously engaging a corresponding side edge of the guide plate and the upper surface of said mounting platform, a stop member fixed to and projecting inwardly from said guide plate, said base of the light source having a depending skirt portion at one end clearing the upper surface of the guide plate, and an adjustable abutment member carried by said skirt portion for engaging said stop member, a second stop member carried by said guide plate, said base of the light source having a second depending end skirt portion opposite the first mentioned skirt portion engageable with the second stop member, whereby the light source is movable between two positional extremes.

References Cited

UNITED STATES PATENTS

| | | | |
|---|---|---|---|
| 1,524,289 | 1/1925 | Christie | 95—46 |
| 1,673,163 | 6/1928 | Schmelzkopf. | |
| 2,435,300 | 2/1948 | Weiskopf | 240—2 |
| 2,654,640 | 10/1953 | Bullard | 308—3 |

FOREIGN PATENTS

| | | |
|---|---|---|
| 372,682 | 3/1923 | Germany. |

DAVID H. RUBIN, *Primary Examiner.*

JEWELL H. PEDERSEN, *Examiner.*

L. ORLOFF, J. G. BOLTEN, *Assistant Examiners.*

UNITED STATES PATENT OFFICE
CERTIFICATE OF CORRECTION

Patent No. 3,322,481                                      May 30, 1967

William E. Foley

It is hereby certified that error appears in the above numbered patent requiring correction and that the said Letters Patent should read as corrected below.

Column 4, line 10, for "inwardly" read -- upwardly --.

Signed and sealed this 26th day of December 1967.

(SEAL)
Attest:

Edward M. Fletcher, Jr.                                EDWARD J. BRENNER

Attesting Officer                                          Commissioner of Patents